United States Patent
Takasu et al.

(10) Patent No.: US 6,671,403 B1
(45) Date of Patent: *Dec. 30, 2003

(54) PATTERN RECOGNITION APPARATUS AND METHOD UTILIZING CONVERSION TO A COMMON SCALE BY A LINEAR FUNCTION

(75) Inventors: Eiji Takasu, Yokohama (JP); Tsunekazu Arai, Tama (JP); Hiroto Yoshii, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/715,121

(22) Filed: Sep. 17, 1996

(30) Foreign Application Priority Data

Sep. 18, 1995 (JP) .............................. 7-238700

(51) Int. Cl.[7] .................................. G06K 9/00
(52) U.S. Cl. ....................... 382/187; 382/227
(58) Field of Search ............... 382/227, 228, 382/209, 218, 219, 185–190

(56) References Cited

U.S. PATENT DOCUMENTS

| | | | | |
|---|---|---|---|---|
| 3,764,980 A | * | 10/1973 | Dansac et al. ........... | 382/146.3 |
| 4,484,348 A | * | 11/1984 | Shizuno ....................... | 382/48 |
| 4,607,386 A | * | 8/1986 | Morita et al. ................. | 382/13 |
| 4,760,604 A | * | 7/1988 | Cooper et al. ................ | 382/15 |
| 5,048,113 A | * | 9/1991 | Yamagata et al. ............ | 382/57 |
| 5,265,174 A | | 11/1993 | Nakatsuka ................... | 382/38 |
| 5,392,367 A | * | 2/1995 | Hsu et al. ..................... | 382/39 |
| 5,410,612 A | | 4/1995 | Arai et al. .................... | 382/13 |
| 5,481,625 A | * | 1/1996 | Suzuki ........................ | 382/187 |
| 5,519,786 A | * | 5/1996 | Courtney et al. ........... | 382/159 |
| 5,621,809 A | * | 4/1997 | Bellegarda et al. ......... | 382/116 |
| 5,960,393 A | * | 9/1999 | Cohrs et al. ................ | 704/240 |

* cited by examiner

*Primary Examiner*—Amelia M. Au
*Assistant Examiner*—Martin Miller
(74) *Attorney, Agent, or Firm*—Fitzpatrick, Cella, Harper & Scinto

(57) ABSTRACT

Two different recognition processing units respectively perform a plurality of different recognition processing operations for the pattern to be recognized input from a character input unit, and acquire a plurality of recognition candidates and recognition scores. An accuracy calculation unit converts the recognition scores obtained by the two recognition processing units into accuracies based on a scale common to the plurality of different recognition processing operations using parameters stored in a parameter storage unit. A determination unit generates a recognition candidate sequence by determining the order of the recognition candidates obtained by the two recognition processing units on the basis of the accuracies converted by the accuracy calculation unit.

30 Claims, 10 Drawing Sheets

FIG. 9

| CANDIDATE ORDER | CANDIDATE CHARACTER | ACCURACY |
|---|---|---|
| 1 | P | 98 |
| 2 | p | 90 |
| 3 | O | 72 |
| 4 | F | 62 |
| 5 | Q | 53 |

CANDIDATE AND ACCURACY OF RECOGNITION PROCESSING UNIT A

| CANDIDATE ORDER | CANDIDATE CHARACTER | ACCURACY |
|---|---|---|
| 1 | P | 99 |
| 2 | R | 83 |
| 3 | o | 75 |
| 4 | p | 74 |
| 5 | Q | 60 |

CANDIDATE AND ACCURACY OF RECOGNITION PROCESSING UNIT B

COMBINE

| CANDIDATE ORDER | CANDIDATE CHARACTER | ACCURACY |
|---|---|---|
| 1 | P | 99 |
| 2 | p | 90 |
| 3 | R | 83 |
| 4 | o | 75 |
| 5 | O | 72 |
| 6 | F | 62 |
| 7 | Q | 60 |

FINAL CANDIDATE AND ACCURACY

FIG. 10

| ②＼① | 0~50 | 51~100 | 101~150 | 151~200 | 201~250 |
|---|---|---|---|---|---|
| 0~25 | 90 | 85 | 76 | 61 | 53 |
| 26~50 | 92 | 90 | 78 | 64 | 55 |
| 51~75 | 95 | 92 | 80 | 65 | 57 |
| 76~100 | 97 | 95 | 82 | 70 | 58 |
| 101~125 | 99 | 90 | 86 | 73 | 60 |

① : RECOGNITION SCORE OF FIRST CANDIDATE

② : DIFFERENCE BETWEEN FIRST AND SECOND RECOGNITION SCORES

PATTERN RECOGNITION APPARATUS AND METHOD UTILIZING CONVERSION TO A COMMON SCALE BY A LINEAR FUNCTION

BACKGROUND OF THE INVENTION

The present invention relates to a pattern recognition method and apparatus, and a computer controller for converting an input unknown pattern into a code or the like by comparing the input pattern with a standard pattern prepared in advance and, more particularly, to a pattern recognition method and apparatus, and a computer controller for acquiring a recognition candidate using a plurality of recognition methods with respect to an input unknown pattern.

In general, a large number of techniques for converting an input unknown pattern into a code by comparing the input pattern with a standard pattern pre-stored in a recognition dictionary or the like have been proposed. For example, in the field of on-line handwritten recognition, a vector matching method in which a set of coordinate points of handwritten strokes input from, e.g., a tablet is processed as an unknown pattern, the strokes are converted into vectors, and the vectors are compared with basic vectors in a recognition dictionary to derive a recognition result, a feature point matching method in which strokes constituting a character are approximated by some feature points (representative points), and the distances between the approximated feature points and those of a standard pattern in a recognition dictionary are calculated to derive a recognition result, and the like are representative methods. In such recognition methods, the order of candidates of character codes obtained by recognition processing is determined using the similarity (a recognition calculation value or the like) between an input character pattern and a standard pattern in a recognition dictionary.

Recently, the following method has been proposed. This method uses a combination of a basic recognition process using a standard recognition dictionary pre-stored in a recognition apparatus, and a registered recognition process for improving the recognition rate by additionally registering or changing character data unique to a user and corresponding character codes as a personal dictionary, thereby outputting a recognition result.

However, in this prior art, when the basic recognition process and the registered recognition process are used in combination, if these two processes have different algorithms, a problem is posed upon outputting candidates. For example, assume that A represents a recognition result of an input unknown pattern in the basic recognition process, and B represents a recognition result in the registered recognition process. In this case, a candidate sequence must be generated by combining A and B as a final recognition result. However, since the recognition results A and B are output results of different algorithms, and have different levels of recognition calculation values, a candidate order sequence cannot be normally generated by merely comparing the calculation values.

SUMMARY OF THE INVENTION

The present invention has been made in consideration of the above-mentioned problem and has as its object to provide a pattern recognition method and apparatus, which can arrange recognition results obtained by individual recognition methods in an appropriate order when recognition results obtained by applying a plurality of different recognition methods to a certain unknown pattern are to be combined and output.

It is another object of the present invention to improve the recognition precision by appropriately determining the recognition candidate order.

In order to achieve the above objects, a pattern recognition apparatus according to the present invention comprises the following arrangement.

That is, there is provided a pattern recognition apparatus for performing pattern recognition by calculating a similarity amount between a pattern to be recognized and each of standard patterns which are registered in advance, comprising recognition means for performing a plurality of different recognition processing operations for the pattern to be recognized, and acquiring one or a plurality of recognition candidates and similarity amounts in each recognition processing operation, conversion means for converting the similarity amounts obtained by the respective recognition processing operations of the recognition means into similarity amounts based on a scale common to the plurality of different recognition processing operations, and generation means for generating a recognition candidate sequence by determining an order of the recognition candidates obtained by the plurality of different recognition processing operations on the basis of the similarity amounts converted by the conversion means.

Preferably, the apparatus further comprises storage means for storing a function representing a relationship between similarities and corresponding accuracies for each of the plurality of different recognition processing operations, and the conversion means converts the similarity amounts obtained by each recognition processing operation of the recognition means into accuracies using the function stored in the storage means, and uses the converted accuracies as the similarity amounts in the common scale. The similarity amounts expressed using scales inherent to the respective recognition processing operations can be easily converted into accuracies, and the accuracies of recognition candidates obtained from the plurality of recognition processing operations can be normally grasped.

Preferably, the function stored in the storage means is a linear function. Since the relationship between the similarity and the accuracy is approximated by a linear function, the processing contents can be simplified.

Preferably, the apparatus further comprises storage means for storing a table for associating states of N-th and (N+1)-th similarity amounts to an accuracy for each of the plurality of different recognition processing operations, and the conversion means acquires an N-th accuracy on the basis of the N-th and (N+1)-th similarity amounts obtained by each recognition processing operation of the recognition means with reference to the table stored in the storage means, and uses the acquired accuracy as the similarity amount in the common scale. In consideration of the difference between N-th and (N+1)-th similarity amounts, the recognition states can be reflected in the accuracies, and conversion into accuracies can be performed more appropriately.

Preferably, the table stored in the storage means registers a relationship between states of first and second similarity amounts and an accuracy corresponding to the first similarity amount, and the conversion means acquires the N-th accuracy by substituting the N-th and (N+1)-th similarity amounts in the first and second similarity amounts in the table to obtain an accuracy, and multiplying the obtained accuracy with an (N−1)-th accuracy. The memory capacity can be saved since all the similarity amounts can be converted into accuracies by storing only a table that stores a correspondence between the states of the first and second similarity amounts and accuracies for each processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a view showing the combining state of recognition candidates in the first embodiment;

FIG. 10 is a table used for calculating the accuracy according to the second embodiment of the present invention.

DETAILED DESCRIPTION OF THE PREFERRED EMBODIMENTS

Preferred embodiments of the present invention will now be described in detail in accordance with the accompanying drawings.

In the following description of the embodiments, an on-line character recognition system will be exemplified. However, the pattern recognition method and apparatus of the present invention are not limited to the character recognition system, but may be applied to audio or image pattern recognition.

First Embodiment

Figure 1:
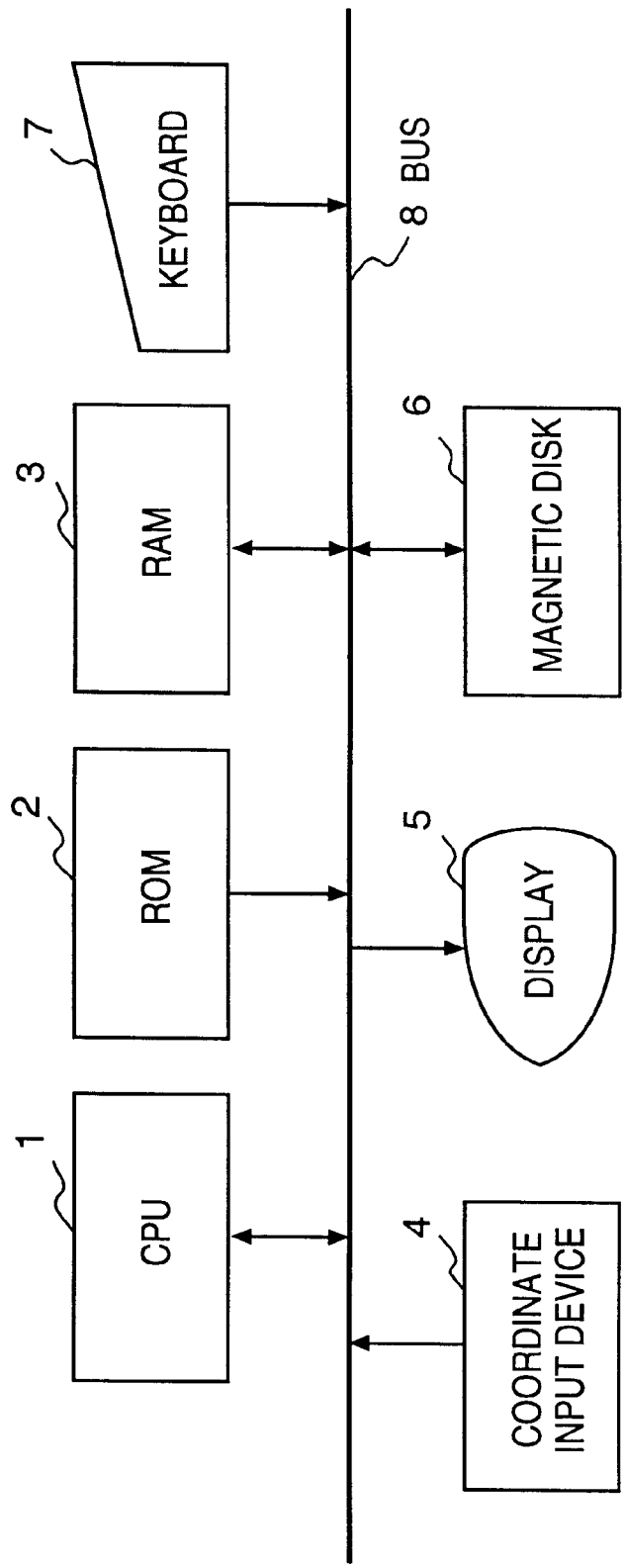
FIG. 1 is a block diagram showing the arrangement of a character recognition apparatus according to the first embodiment of the present invention.

FIG. 1 is a block diagram showing the arrangement of a character recognition apparatus according to the first embodiment of the present invention. Referring to FIG. 1, reference numeral 1 denotes a CPU for realizing various processing operations in accordance with control programs stored in a ROM 2 or a RAM 3. Reference numeral 2 denotes a ROM for storing control programs to be executed by the CPU 1 and various data. Reference numeral 3 denotes a RAM for storing control programs to be executed by the CPU 1, which programs are loaded from an auxiliary storage device such as a magnetic disk 6 or the like, and providing a work area used when the CPU 1 executes various kinds of processing.

Reference numeral 4 denotes a coordinate input device for outputting strokes input by a user as a coordinate point sequence. Reference numeral 5 denotes a display for displaying a character recognition result and the like. Reference numeral 6 denotes a magnetic disk which serves as an auxiliary storage device. As the magnetic disk 6, a floppy disk, a hard disk, or the like may be used. Note that the magnetic disk is used in this embodiment. Alternatively, a CD-ROM, a magneto-optical disk, and the like may be used instead.

Reference numeral 7 denotes a keyboard used for performing various operation inputs. Reference numeral 8 denotes a bus for transferring data among the above-mentioned components.

Even an apparatus exclusively used for character recognition or a versatile computer apparatus such as a personal computer may comprise the above-mentioned arrangement, and this embodiment may be realized by either of these apparatuses. However, in the following description, an on-line character recognition apparatus will be exemplified. When a special-purpose character recognition apparatus is constituted, the recognition programs and the like may be stored in the ROM 2, and the magnetic disk 6 may be omitted.

Figure 2:
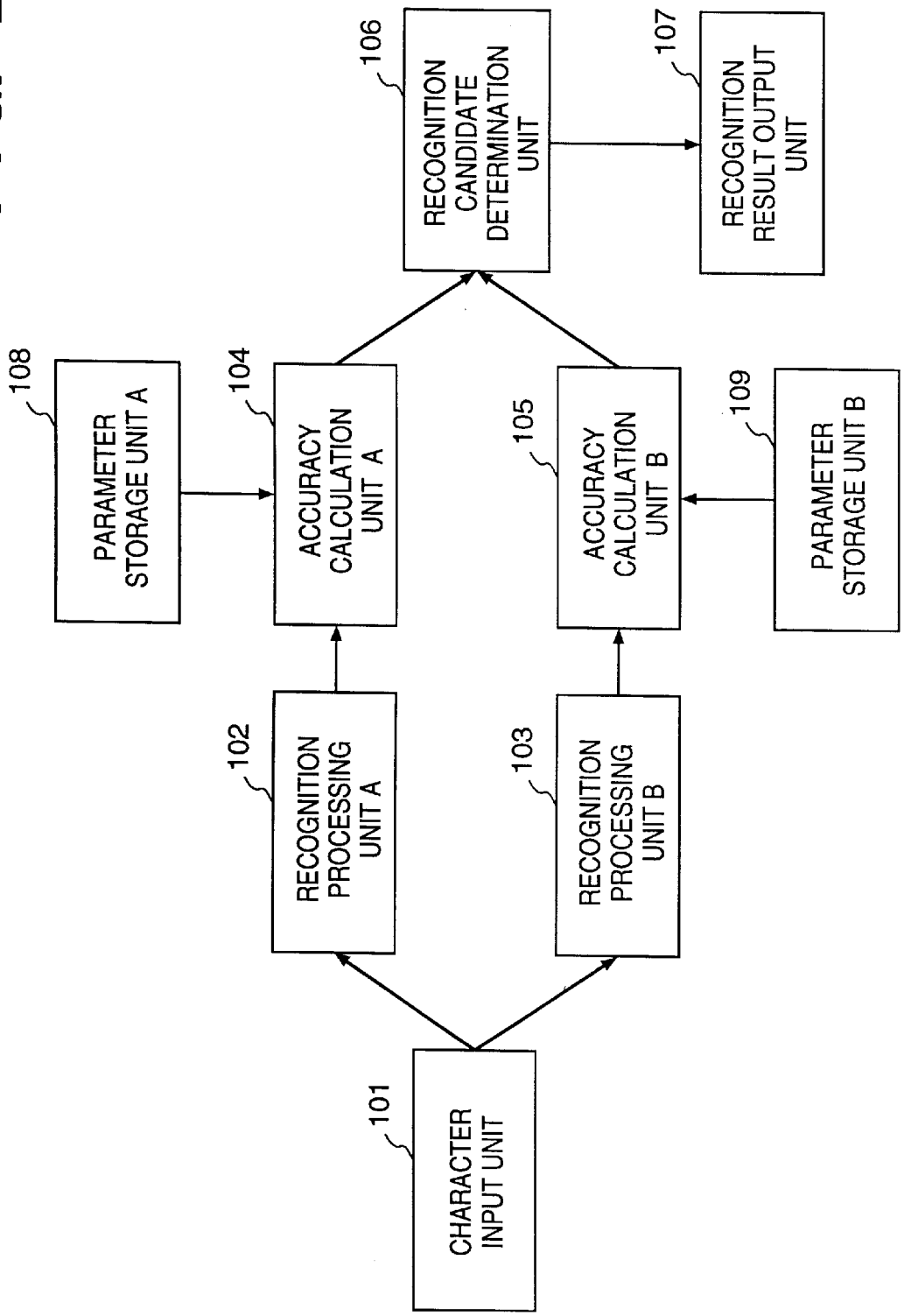
FIG. 2 is a schematic block diagram showing the functional arrangement of an on-line character recognition system.

FIG. 2 is a schematic block diagram showing the functional arrangement of an on-line character recognition system according to this embodiment. Referring to FIG. 2, reference numeral 101 denotes a character input unit which fetches strokes input by the user using a coordinate input device 4 such as a tablet and a stylus pen as a set of coordinate points, and stores them in a memory buffer (to be assured on the RAM 3). Reference numerals 102 and 103 denote recognition processing units A and B, which perform character recognition on the basis of the coordinate set obtained by the character input unit 101. Each of the recognition processing units 102 and 103 comprises a recognition dictionary (not shown) that stores standard patterns of characters.

Reference numerals 104 and 105 denote accuracy calculation units A and B for calculating accuracies indicating the correctness of recognition on the basis of comparison calculation values between character codes of a plurality of recognition results obtained by the recognition processing units A 102 and B 103 and standard patterns. Reference numeral 106 denotes a recognition candidate determination unit for determining final recognition results as a recognition candidate group using the accuracies calculated by the accuracy calculation units A 104 and B 105. Reference numeral 107 denotes a recognition result output unit for outputting the recognition candidates determined by the recognition candidate determination unit 106 to the display 5 and the like. Reference numerals 108 and 109 denote parameter storage units A and B for storing data used in the accuracy calculation units A 104 and B 105, respectively.

In the first embodiment, as can be seen from FIG. 2, recognition results are derived using a plurality of recognition processing operations (the recognition processing units A 102 and B 103) for input character strokes. Since these recognition processing methods are realized by known techniques, they are not limited to specific ones, but the recognition processing units A 102 and B 103 are assumed to use different recognition algorithms. This embodiment will exemplify a case wherein the recognition processing unit A 102 uses vector matching recognition processing, and the recognition processing unit B 103 uses feature point matching processing.

Figure 3:
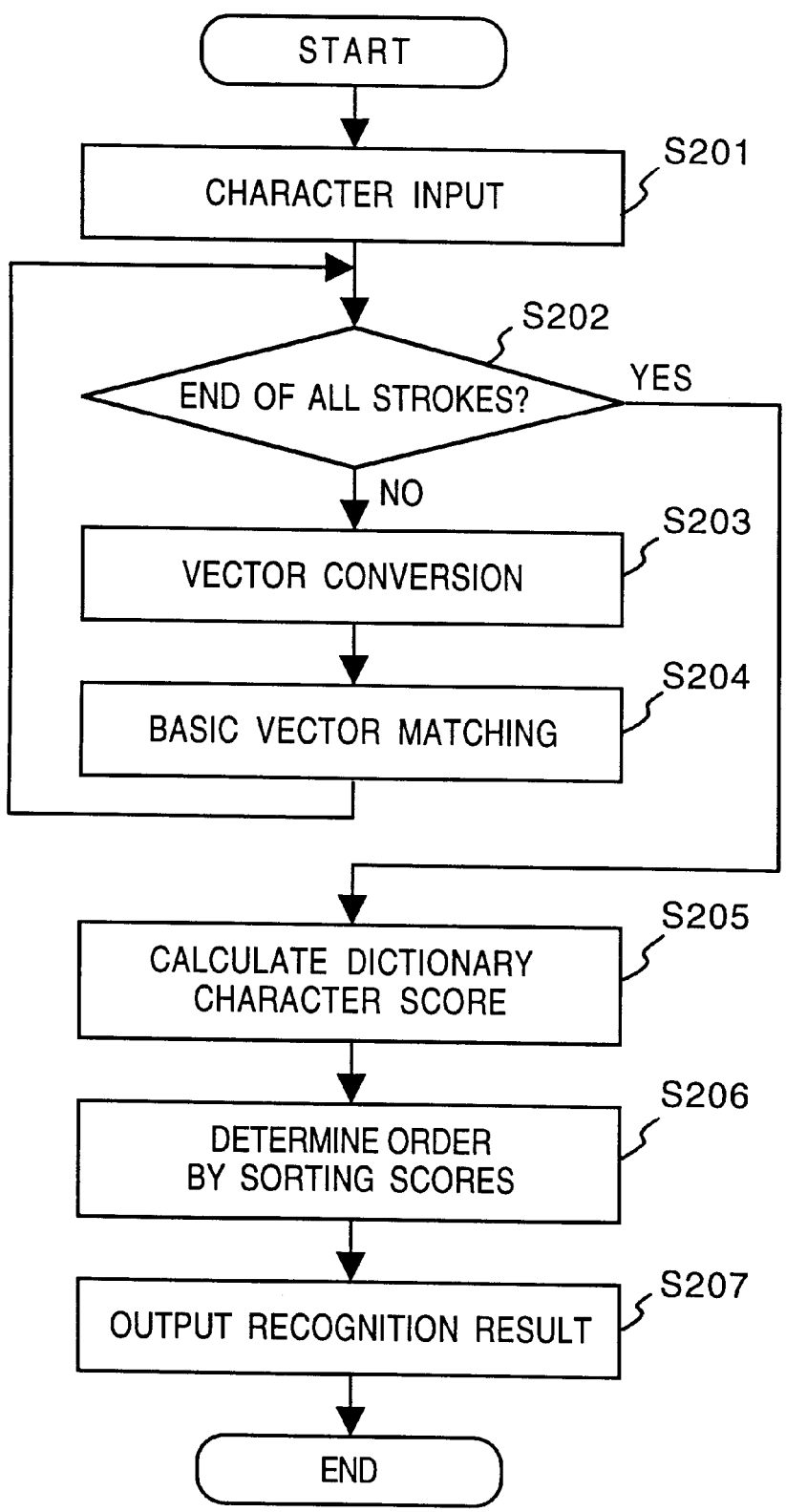
FIG. 3 is a flow chart showing the procedure of character recognition processing based on vector matching recognition processing.

FIG. 3 is a flow chart showing the procedure of the character recognition processing based on the vector matching recognition processing. The vector matching recognition to be executed by the recognition processing unit A 102 is processed in accordance with the processing flow shown in FIG. 3.

In step S201, a set of coordinate points input from the character input unit 101 is separated into coordinate points in units of strokes on the basis of pen-up information and pen-down information. In step S202, it is checked if the processing operations in steps S203 and S204 have been performed for all the input strokes.

In step S203, each stroke is converted into a vector on the basis of the coordinate points in units of separated strokes. The vector conversion technique uses a method of expressing each stroke by n vectors by dividing the entire stroke into n line segments and assigning a vector value to a straight line connecting the start and end points of each line segment. Upon completion of vector conversion of a stroke, the flow advances to step S204, and the differences between the input stroke and reference stroke vectors called a basic stroke, which is prepared in advance, are calculated. Basic strokes are obtained by extracting representative ones of strokes constituting characters, and each basic stroke is expressed by n vectors and is registered in a basic stroke dictionary.

In step S204, the differences between the vector values of all basic stroke vectors and input stroke vectors calculated in step S203 are checked. If the two vectors have an identical vector value, the penalty score is zero, and as the difference becomes larger, the penalty score becomes larger. At this time, the penalty score total between one input stroke and the basic stroke vectors is calculated.

If it is determined in step S202 that vector conversion and basic vector matching between vector values have been completed for all the strokes, the flow advances to step S205 to calculate the dictionary character score. In this step, a recognition dictionary called a character constituting dictionary is used. The character constituting dictionary stores characters to be recognized, and each stored character is expressed as a set of basic strokes that constitute the character. For basic strokes of characters in this character constituting dictionary, the total of the basic stroke penalty scores of the respective strokes of the input character is calculated. This processing is performed for all the characters in the character constituting dictionary, and score totals calculated for the respective characters serve as recognition scores for the character constituting dictionary, i.e., similarities.

With the above-mentioned processing, as a character has a recognition score closer to zero, it is determined that the character has higher similarity. In step S206, characters are sorted in the ascending order of recognition scores, thus generating a recognition candidate sequence. A recognition result is obtained as a sequence of pairs of character codes and recognition stores in the order of candidates. In step S207, the recognition result is stored in a memory buffer (assured on the RAM 3).

Figure 4:
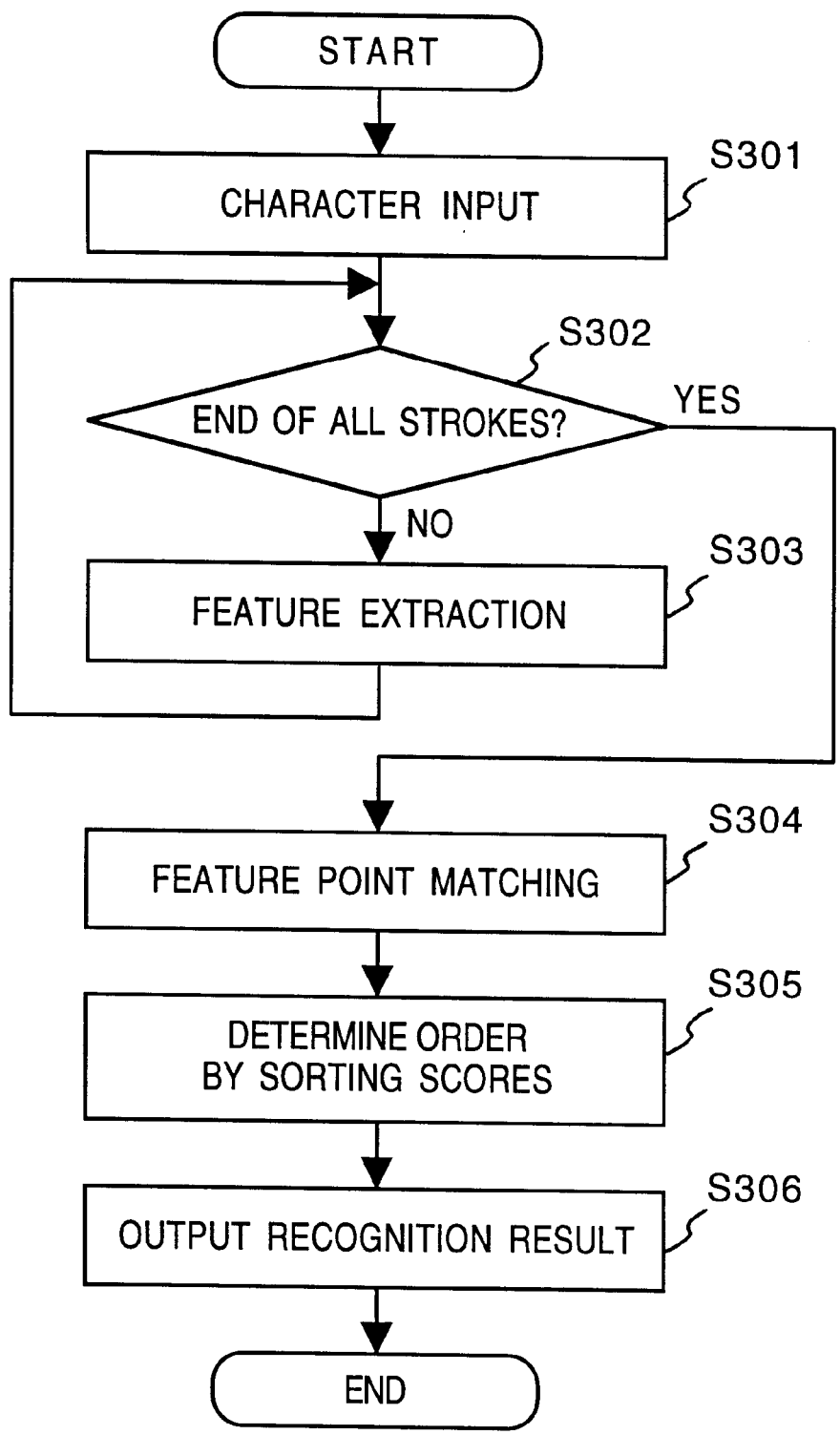
FIG. 4 is a flow chart for explaining the procedure of character recognition based on feature point matching recognition.

The feature point matching recognition executed by the recognition processing unit B 103 will be explained below. FIG. 4 is a flow chart for explaining the character recognition procedure based on feature point matching recognition.

As in the vector matching processing, a coordinate point sequence input by the character input unit 101 is divided in units of strokes in step S301. It is checked in step S302 if processing in step S303 (to be described below) has been executed for all the strokes.

In step S303, feature point extraction is performed for each stroke. In the feature point extraction, representative points constituting each stroke are extracted, and a "feature point" especially indicates a point of inflection of a stroke shape. This extraction is attained using a known technique.

If it is determined in step S302 that the feature point extraction of all the strokes has ended, the flow advances to step S304 to execute feature point matching processing. In this feature point matching processing, a recognition dictionary that pre-stores standard feature point information for each of characters to be recognized is used. A distance calculation between corresponding feature points of an input character and characters in the recognition dictionary is made. The distance calculation uses a two-dimensional cityblock distance, Euclidean distance, or the like. Since the number of feature points of an input character does not always match that of a character in the recognition dictionary, processing in this case is attained using, e.g., a DP matching method. Using this processing procedure, the distance values between the input character pattern and standard patterns in the recognition dictionary can be calculated. Note: the similarity is higher as the distance value from a standard pattern, i.e., the recognition score is smaller.

In step S305, the calculated recognition scores are sorted in the ascending order, thus acquiring recognition results as pairs of character codes and recognition scores. In step S306, the recognition results are stored in a memory buffer.

Figure 5:
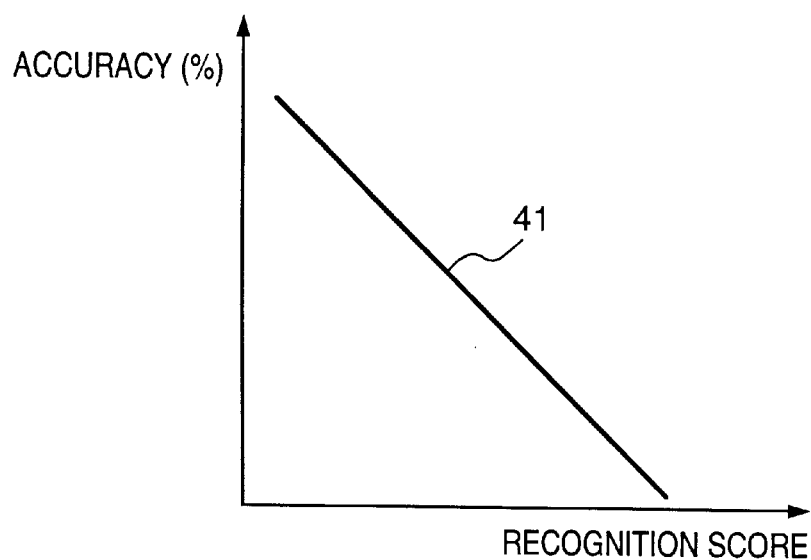
FIG. 5 is a graph showing an example of the relationship between the recognition score and the recognition accuracy by a recognition processing unit A 102.
Figure 6:
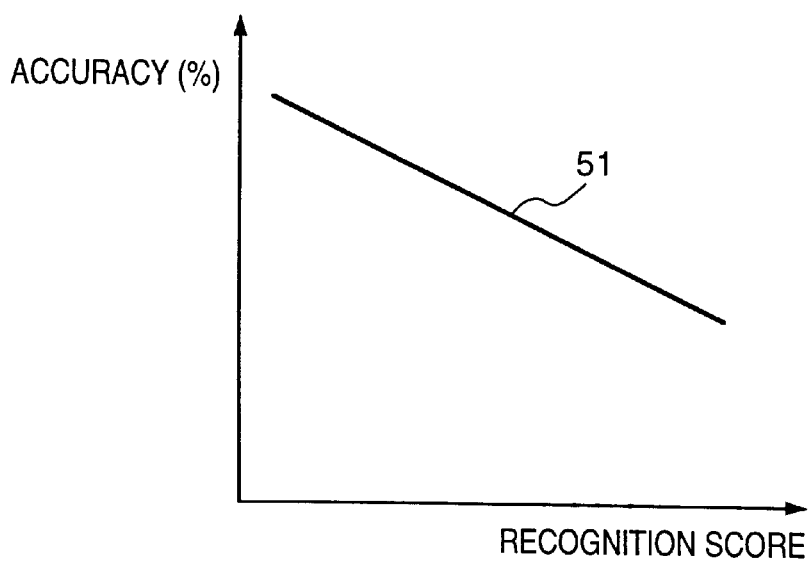
FIG. 6 is a graph showing an example of the relationship between the recognition score and the recognition accuracy by a recognition processing unit B 103.

The accuracy calculation units A 104 and B 105 will be explained below. In these accuracy calculation units, data representing the relationship between the accuracies and the recognition scores is prepared by experiments. Based on experiments using a large number of learning samples, the relationship between the recognition scores and the accuracies obtained as recognition results is obtained. Assume that the relationship between the recognition scores and recognition accuracies obtained by the recognition processing unit A 102 is expressed as shown in FIG. 5, and that obtained by the recognition processing unit B 103 is expressed as shown in FIG. 6. In FIGS. 5 and 6, the abscissa plots the recognition score, and the ordinate plots the accuracy in correspondence with the recognition score. Line segments denoted by reference numerals 41 and 51 are respectively given by formulas (1) and (2) below:

$$p1 = a1 \cdot X + b1 \qquad (1)$$

$$p2 = a2 \cdot X + b2 \qquad (2)$$

where p is the accuracy and X is the recognition score.

Therefore, the parameter storage unit A 108 stores parameters a1 and b1 in formula (1) above, and the parameter storage unit B 109 stores parameters a2 and b2 in formula (2) above.

The accuracy calculation units A 104 and B 106 respectively convert the recognition scores obtained by the recognition processing units A 102 and B 103 into accuracies using the above-mentioned parameters and formulas (1) and (2). The recognition candidate determination unit 106 combines and outputs recognition candidates output from the two recognition processing units using these accuracies. The procedure of the processing to be executed by these accuracy calculation units (104, 105), the recognition candidate determination unit 106, and the recognition result output unit 107 will be explained below with reference to the flow charts shown in FIGS. 7 and 8.

Figure 7:
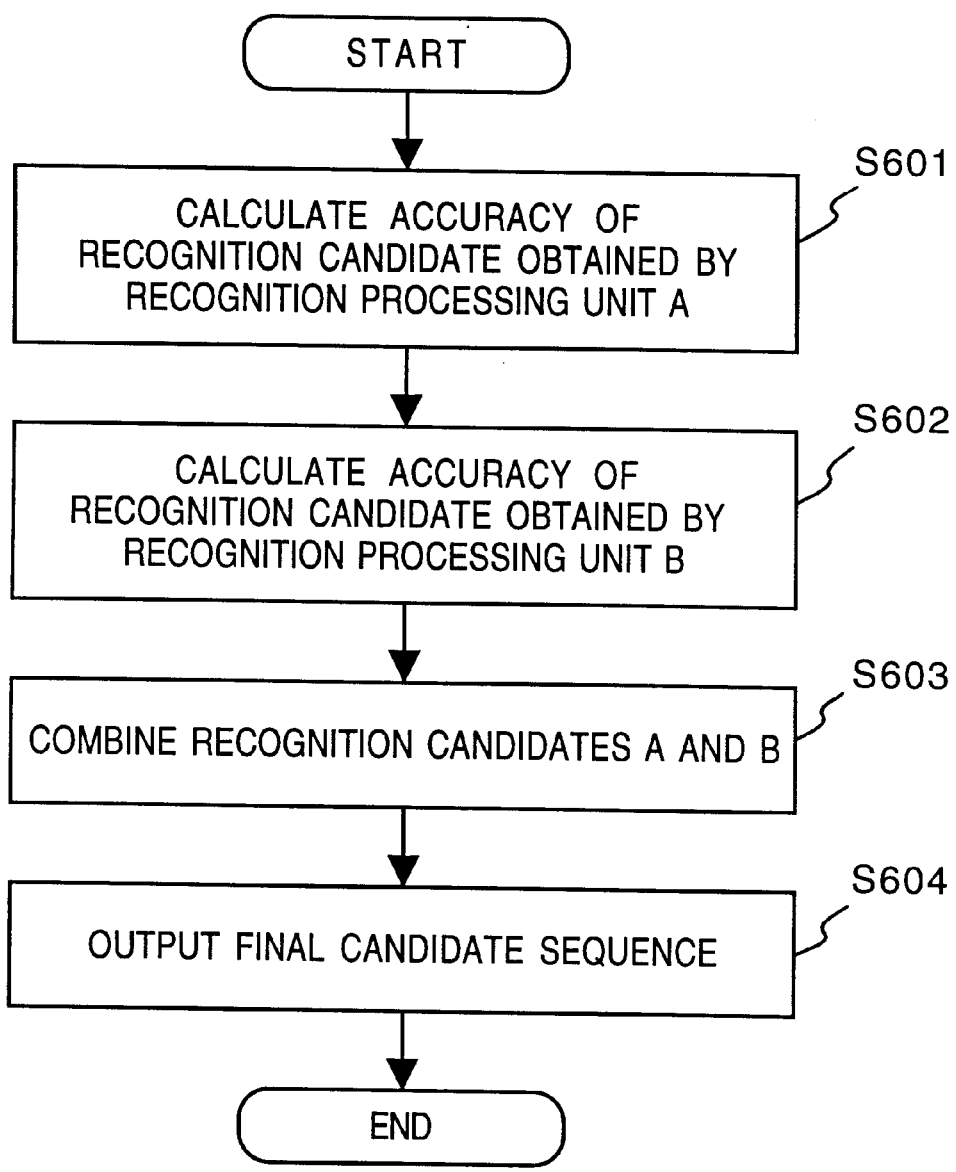
FIG. 7 is a flow chart showing the procedure for combining and outputting recognition candidates obtained by the two recognition units.
Figure 8:
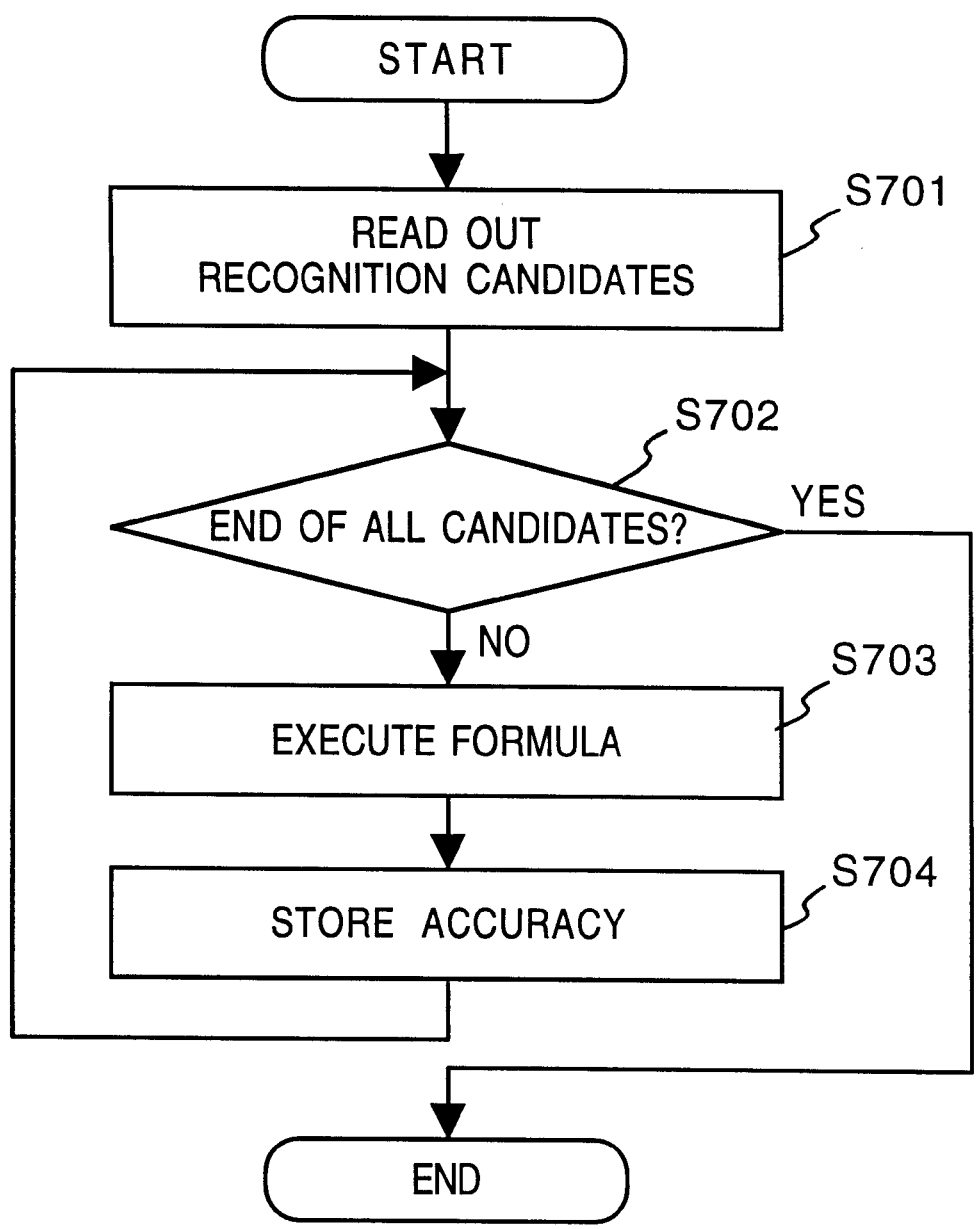
FIG. 8 is a flow chart showing the procedure for calculating the accuracy on the basis of the recognition score.

FIG. 7 is a flow chart for explaining the procedure for combining and outputting recognition candidates obtained by the two recognition processing units. FIG. 8 is a flow chart showing the procedure for calculating the accuracy on the basis of the recognition score (the processing procedure in the accuracy calculation units A 104 and B 105).

In step S601, the accuracy calculation unit A 104 calculates the accuracy of a recognition candidate (to be referred to as a recognition candidate A hereinafter) obtained by the recognition processing unit A 102. In step S602, the accuracy calculation unit B 105 calculates the accuracy of a recognition candidate (to be referred to as a recognition candidate B hereinafter) obtained by the recognition processing unit B 103. Note that the processing contents in steps S601 and S602 are as shown in FIG. 8.

The procedure for calculating the accuracies in steps S601 and S602 will be explained below with reference to the flow chart in FIG. 8. In step S701, recognition candidates are read out from the memory buffer. If there are N recognition candidates, processing operations in steps S703 and S704 are executed for N recognition candidates under the control of step S702, and as a result, the processing operations in steps S703 and S704 are repeated N times.

In step S703, the recognition score of a recognition candidate is substituted in X in formula (1) (or formula (2) for a candidate obtained by the recognition processing unit B), and p1 (or p2 for a candidate obtained by the recognition processing unit B) is calculated using the parameters a1 and b1 stored in the parameter storage unit A 108 (or a2 and b2 stored in the parameter storage unit B 109 for a candidate obtained by the recognition processing unit B). The value p1 (or p2) serves as an accuracy.

Since this accuracy has the same range width as that shown in FIGS. 5 and 6, its maximum value is 100, and its minimum value is 0. Hence, as the value is larger, the accuracy becomes higher. The calculated accuracy is stored together with its character code in step S704.

In step S603 in FIG. 7, the respective recognition candidates are combined. This process is attained by merging recognition candidates A and B in the order of higher accuracies calculated by the accuracy calculation units A 104 and B 105. When the recognition candidates A and B include the same character code, a higher accuracy is used to avoid repetition of a character code in candidates. In step S604, finally combined recognition candidates are output.

FIG. 9 is a view showing a state wherein recognition candidates are combined according to this embodiment. The recognition candidates A and B are sorted in the order of higher accuracies, thereby combining candidates obtained by the two recognition processing units. As can be seen from FIG. 9, as for the same candidate characters, one with a higher accuracy is used.

In this embodiment, two different recognition algorithms are used. However, the recognition techniques are not limited to those described in this embodiment, but other techniques may be used. Also, three or more recognition algorithms may be used. Furthermore, formulas (1) and (2) are expressed by linear formulas but may be expressed by n-th order formulas.

Second Embodiment

In the first embodiment, upon calculation of the accuracy of a recognition result, functional formulas obtained from experimental data shown in FIGS. 5 and 6 are prepared in advance, and function parameters used in these functional formulas are stored, thus realizing conversion into an accuracy. In the second embodiment, a technique for calculating the accuracy of a recognition candidate on the basis of the difference between the recognition score of the N-th candidate and that of the (N+1)-th candidate will be explained.

As in the first embodiment, recognition experimental data are prepared in advance using a large number of samples. At this time, the differences between the recognition scores of the first and second candidates of recognition results based on the prepared samples are summarized in a table. FIG. 10 shows this state. Numerals in a table shown in FIG. 10 indicate the accuracies of samples.

Originally, as the recognition score is smaller, the correctness of the recognition result of the corresponding character is higher (when the recognition calculation is attained by the distance calculation). In the relationship between the recognition scores of the first and second recognition candidates, even when the first recognition score is high, if the difference from the recognition score of the second candidate is small, the character of the second candidate may be the correct answer with high probability. Hence, the accuracy of the first candidate lowers. Therefore, as can be seen from the numerals in the table in FIG. 10, the recognition rate becomes higher toward the lower left corner of the table.

In the second embodiment, this table is stored as an accuracy table in the parameter storage units A 108 and B 109 shown in FIG. 2, and the accuracy calculation units A 104 and B 105 calculate accuracies with reference to such table in the processing in steps S601 and S602 in FIG. 7. Of course, since the contents of the accuracy table vary depending on the type of recognition processing, the two parameter storage units store different accuracy tables. Then, the accuracy table is looked up using the recognition score of the first one of recognition candidates obtained as a result of the recognition processing, and the calculated difference between the recognition stores of the first and second candidates. With the above-mentioned operation, the accuracy of the first recognition candidate is obtained. Similarly, the N-th accuracy is obtained by looking up the accuracy table using the N-th recognition score and the difference between the N-th and (N+1)-th recognition scores. When N is equal to or larger than 2, the N-th accuracy is obtained by multiplying the accuracy obtained from the table with the (N−1)-th accuracy.

For example, when the recognition score of the first candidate is 35, the recognition score of the second candidate is 80, and the recognition score of the third candidate is 95, the processing is performed as follows. The accuracy of the first candidate is 92 (%) from the table shown in FIG. 10. The accuracy of the second candidate is obtained in the following procedure. The recognition scores of the second and third candidates are considered as those of the first and second candidates to obtain 85 (%) from the table shown in FIG. 10. Subsequently, since the accuracy of the first candidate is 92 (%), as described above, it is multiplied with 85 (%) to obtain 78 (%). This value, 78 (%), is the accuracy of the second candidate. In this manner, the accuracies of the second and subsequent candidates can be calculated form the table for determining the accuracy of the first candidate. Therefore, since one type of table shown in FIG. 10 need only be prepared for each recognition processing, the memory capacity can be saved.

Note that tables shown in FIG. 10 may be prepared in units of orders, needless to say. In this case, appropriate tables can be prepared in units of orders, and the character recognition precision can be improved.

Note that the arrangement other than that associated with the above-mentioned accuracy calculation method of the second embodiment is the same as that of the first embodiment. Therefore, recognition scores are combined based on the accuracies in the same manner as in the first embodiment, and a detailed description thereof will be omitted.

As described above, according to the above-mentioned embodiments, in the recognition method for converting an input unknown pattern into a code by recognition processing, recognition scores obtained by a plurality of different recognition processing operations are converted into accuracies as a common scale. As a result, recognition candidates obtained by a plurality of different recognition processing operations can be appropriately combined, and a merit of a plurality of different recognition processing operations can be utilized, thus outputting recognition results more appropriately. Since the accuracies are expressed by common indices ranging from 0 to 100, the correctnesses of recognition results can be presented to a user in an easy-to-understand form. The recognition processing results can be prevented from depending on a specific recognition algorithm, and general recognition results can be output, thereby improving the recognition rate.

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiment may be realized not only by executing the program code read out by the computer but also by some or all of actual processing operations executed by an OS (operating system) running on the computer on the basis of an instruction of the program code.

Furthermore, after the program code read out from the storage medium is written in a memory of a function expansion board or a function expansion unit inserted in or connected to the computer, a CPU of the function expansion board or function expansion unit may execute some or all of actual processing operations on the basis of an instruction of the program code so as to realize the functions of the above-mentioned embodiments.

When the present invention is applied to the above-mentioned storage medium, the storage medium stores the program codes corresponding to the above-mentioned flow charts. The novel functions of the present invention are achieved by loading the storage medium into the apparatus, and executing the program read out from the storage medium. For this purpose, the structural feature of the program according to the present invention is as shown in FIGS. 11A and 11B.

Figure 11A:
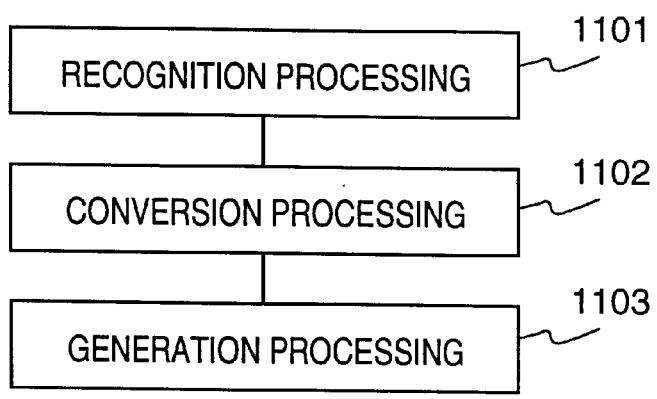
FIGS. 11A and 11B are diagrams for explaining the arrangement of a storage medium that stores a control program for realizing control of the second embodiment.
Figure 11B:
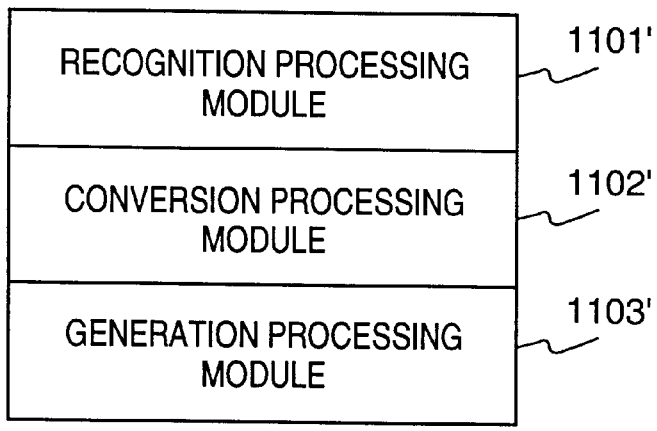

FIGS. 11A and 11B are views for explaining the arrangement of a storage medium that stores a control program for realizing the control of this embodiment. FIG. 11A is a flow chart showing the control procedure of this control program. Referring to FIG. 11A, reference numeral 1101 denotes recognition processing which has a plurality of recognition processing units each for performing pattern recognition by calculating the similarity amount between the pattern to be recognized and each of standard patterns which are registered in advance, performs a plurality of different recognition processing operations for the pattern to be recognized, and acquires a plurality of recognition candidates and recognition scores from the respective recognition processing units. The recognition processing 1101 corresponds to the recognition processing units A 102 and B 103 shown in FIG. 2 in the above embodiment.

Reference numeral 1102 denotes conversion processing, which converts the recognition scores obtained by the respective recognition processing units of the recognition processing 1101 into accuracies as a common scale to the plurality of different recognition processing operations. In the above embodiment, the accuracy calculation units A 104 and B 105 correspond to the conversion processing 1102. Reference numeral 1103 denotes generation processing which generates a recognition candidate sequence by determining the order of recognition candidates obtained by a plurality of recognition processing units on the basis of the accuracies obtained by the conversion processing 1102. This processing corresponds to the recognition candidate determination unit 106.

The above-mentioned processing steps are realized by executing program modules shown in FIG. 11B by a computer. FIG. 11B is a memory map showing the storage state of the respective program modules in the storage medium. The above-mentioned recognition processing 1101, conversion processing 1102, and generation processing 1103 are respectively realized by executing a recognition processing module 1101', a conversion processing module 1102', and a generation processing module 1103'.

Note that the present invention may be applied to either a system constituted by a plurality of equipments or an apparatus consisting of a single device.

As described above, according to the present invention, upon combining and outputting recognition candidates obtained by applying a plurality of different recognition methods to a certain unknown pattern, the order of recognition candidates obtained by the respective recognition methods can be appropriately determined. Since the order of recognition candidates can be appropriately determined, the recognition precision can be improved.

As many apparently widely different embodiments of the present invention can be made without departing from the spirit and scope thereof, it is to be understood that the invention is not limited to the specific embodiments thereof except as defined in the claims.

What is claimed is:

1. A pattern recognition apparatus comprising:
   a memory for storing n-th order functions corresponding to each of a plurality of different character-recognition processing operations, each n-th order function being defined by a predetermined relation between a recognition score and a corresponding accuracy for a respective character-recognition processing operation, each n-th order function for converting a recognition score to an accuracy, wherein the recognition score represents similarity amounts between an input pattern and a standard pattern corresponding to each candidate obtained by the respective character-recognition processing operations, wherein a common scale of indices is used for the accuracies obtained from recognition results of the plurality of different character-recognition processing operations;

recognition means for performing the plurality of different character-recognition processing operations for an input pattern, and acquiring, for each of the plurality of different character-recognition processing operations, a plurality of recognition candidates and recognition scores corresponding to the recognition candidates, the recognition scores representing similarity amounts between the input pattern and a standard pattern corresponding to each recognition candidate;

conversion means for converting the recognition score of each candidate obtained by the respective character-recognition processing operations into an accuracy using the n-th order functions corresponding to the respective character-recognition processing operations;

combining means for combining the recognition candidates obtained by each of the different character-recognition processing operations, and sorting the combined recognition candidates on the basis of the corresponding accuracies; and outputting means for outputting the sorted recognition candidates.

2. The pattern recognition apparatus according to claim 1, wherein the n-th order functions are linear functions.

3. The pattern recognition apparatus according to claim 1, wherein each of the plurality of character-recognition processing operations outputs a plurality of recognition candidates.

4. The pattern recognition apparatus according to claim 1, wherein each of the plurality of character-recognition processing operations utilizes different recognition algorithms.

5. The pattern recognition apparatus according to claim 1, wherein one of the plurality of character-recognition processing operations is a vector matching recognition process.

6. The pattern recognition apparatus according to claim 1, wherein one of the plurality of character-recognition processing operations is a feature point matching recognition process.

7. The pattern recognition apparatus according to claim 1, wherein the input pattern is data input from a coordinate input device.

8. The pattern recognition apparatus according to claim 1, wherein the input pattern is data input from a tablet.

9. The pattern recognition apparatus according to claim 1, wherein the input pattern is a data set of coordinates.

10. A pattern recognition apparatus comprising:

recognition means for performing a plurality of different character-recognition processing operations for an input pattern, and acquiring, for each of the character-recognition processing operations, a plurality of recognition candidates and recognition scores corresponding to the recognition candidates, the recognition scores representing similarity amounts between the input pattern and a standard pattern corresponding to each candidate;

storage means for storing a table for obtaining an accuracy of an N-th candidate based on the combination of the recognition score of the N-th candidate and the difference between the recognition scores of the N-th and the (N+1)-th candidates, a common scale of indices being used for the accuracies obtained from the recognition results of the plurality of different character-recognition processing operations, for each of the plurality of different character-recognition processing operations;

obtaining means for obtaining the accuracy of the N-th candidate on the basis of the combination of the recognition score of the N-th candidate and the difference between the recognition scores of the N-th and the (N+1)-th candidates with reference to the table stored in said storage means, for each of the plurality of different character-recognition processing operations; and combining means for combining the recognition candidates obtained by each of different character-recognition processing operations on the basis of the accuracies.

11. The apparatus according to claim 10, wherein the table stored in said storage means registers a relationship among a first recognition score, the difference between the first recognition score and a second recognition score, and an accuracy corresponding to the first recognition score, and said obtaining means acquires the accuracy by substituting the recognition scores of the N-th and (N+1)-th candidates for the first and second recognition scores in the table, and obtains the accuracy of the N-th candidate by multiplying the acquired accuracy with an accuracy of the (N−1)-th candidate, wherein N is equal to or larger than 2.

12. A pattern recognition method comprising:

a recognition step of performing a plurality of different character-recognition processing operations for an input pattern, and acquiring, for each of the plurality of character-recognition processing operations, a plurality of recognition candidates and recognition scores corresponding to the recognition candidates, the recognition scores representing similarity amounts between the input pattern and a standard pattern corresponding to each recognition candidate;

a conversion step of converting the recognition score of each candidate obtained by the respective character-recognition processing operations into an accuracy using n-th order functions corresponding to the respective character-recognition processing operations, each n-th order function being defined by a predetermined relation between the recognition score and the corresponding accuracy for a respective character-recognition processing operation, each n-th order function for converting a recognition score to an accuracy, wherein the recognition score represents similarity amounts between an input pattern and a standard pattern corresponding to each candidate obtained by the respective character-recognition processing operations, wherein a common scale of indices is used for the accuracies obtained from recognition results of the plurality of different character-recognition processing operations;

a combining step of combining the recognition candidates obtained by each of the different character-recognition processing operations, and sorting the combined recognition candidates on the basis of the corresponding accuracies; and an outputting step of outputting the sorted recognition candidates.

13. The pattern recognition method according to claim 12, wherein the n-th order functions are linear functions.

14. The pattern recognition method according to claim 12, wherein each of the character-recognition processing operations outputs a plurality of recognition candidates.

15. The pattern recognition method according to claim 12, wherein each of the character-recognition processing operations utilizes different recognition algorithms.

16. The pattern recognition method according to claim 12, wherein one of the character-recognition processing operations is a vector matching recognition process.

17. The pattern recognition method according to claim 12, wherein one of the character-recognition processing operations is a feature point matching recognition process.

18. The pattern recognition method according to claim 12, wherein the input pattern is data input from a coordinate input device.

19. The pattern recognition method according to claim 12, wherein the input pattern is data input from a tablet.

20. The pattern recognition method according to claim 12, wherein the input pattern is a data set of coordinates.

21. A pattern recognition method comprising:

a recognition step for performing a plurality of different character-recognition processing operations for an input pattern, and acquiring, for each of the character-recognition processing operations, a plurality of recognition candidates and recognition scores corresponding to the recognition candidates, the recognition scores representing similarity amounts between the input pattern and a standard pattern corresponding to each candidate;

a storage step of storing a table for obtaining an accuracy of an N-th candidate based on the combination of the recognition score of the N-th candidate and the difference between the recognition scores of the N-th and the (N+1)-th candidate, a common scale of indices being used for the accuracies obtained from the recognition results of the plurality of different character-recognition processing operations, for each of the plurality of different character-recognition processing operations;

an obtaining step of obtaining the accuracy of the N-th candidate on the basis of the combination of the recognition score of the N-th candidate and the difference between the recognition scores of the N-th and (N+1)-th candidates with reference to the table stored in the storage step, for each of the plurality of different character-recognition processing operations; and a combining step of combining the recognition candidates obtained by each of different character-recognition processing operations on the basis of the accuracies.

22. The method according to claim 21, wherein the table stored in said storage step registers a relationship among a first recognition score, the difference between the first recognition score and a second recognition score, and an accuracy corresponding to the first recognition score, and said obtaining step acquires the accuracy by substituting the recognition scores of the N-th and (N+1)-th candidates for the first and second recognition scores in the table, and obtains the accuracy of the N-th candidate by multiplying the acquired accuracy with an accuracy of the (N−1)-th candidate, wherein N is equal to or larger than 2.

23. A computer-readable memory in which computer-executable process code is stored, said computer-executable process code comprising:

code to perform a recognition step of performing a plurality of different character-recognition processing operations for an input pattern, and acquiring, for each of the plurality of character-recognition processing operations, a plurality of recognition candidates and recognition scores corresponding to the recognition candidates, the recognition scores representing similarity amounts between the input pattern and a standard pattern corresponding to each recognition candidate;

code to perform a conversion step of converting the recognition score of each candidate obtained by the respective character-recognition processing operations into an accuracy using n-th order functions corresponding to the respective character-recognition processing operations, each n-th order function being defined by a predetermined relation between the recognition score and the corresponding accuracy for a respective character-recognition processing operation, each n-th order function for converting a recognition score to an accuracy, wherein the recognition score represents similarity amounts between an input pattern and a standard pattern corresponding to each candidate obtained by the respective character-recognition processing operations, wherein a common scale of indices is used for the accuracies obtained from recognition results of the plurality of different character-recognition processing operations;

code to perform a combining step of combining the recognition candidates obtained by each of the different character-recognition processing operations, and sorting the combined recognition candidates on the basis of the corresponding accuracies; and code for performing an outputting step of outputting the sorted recognition candidates.

24. The computer-readable memory according to claim 23, wherein each of the character-recognition processing operations outputs a plurality of recognition candidates.

25. The computer-readable memory according to claim 23, wherein each of the character-recognition processing operations utilizes different recognition algorithms.

26. The computer-readable memory according to claim 23, wherein one of the character-recognition processing operations is a vector matching recognition process.

27. The computer-readable memory according to claim 23, wherein one of the character-recognition processing operations is a feature point matching recognition process.

28. The computer-readable memory according to claim 23, wherein the input pattern is data input from a coordinate input device.

29. The computer-readable memory according to claim 23, wherein the input pattern is data input from a tablet.

30. The computer-readable memory according to claim 23, wherein the input pattern is a data set of coordinates.

* * * * *

UNITED STATES PATENT AND TRADEMARK OFFICE
CERTIFICATE OF CORRECTION

PATENT NO. : 6,671,403 B1
DATED : December 30, 2003
INVENTOR(S) : Takasu et al.

It is certified that error appears in the above-identified patent and that said Letters Patent is hereby corrected as shown below:

Column 8,
Line 38, "stores" should read -- scores --.

Signed and Sealed this

Seventeenth Day of August, 2004

JON W. DUDAS
*Acting Director of the United States Patent and Trademark Office*